J. M. DAVIDSON.
ATTACHMENT FOR LAWN MOWERS.
APPLICATION FILED SEPT. 22, 1917.
1,312,618.
Patented Aug. 12, 1919.
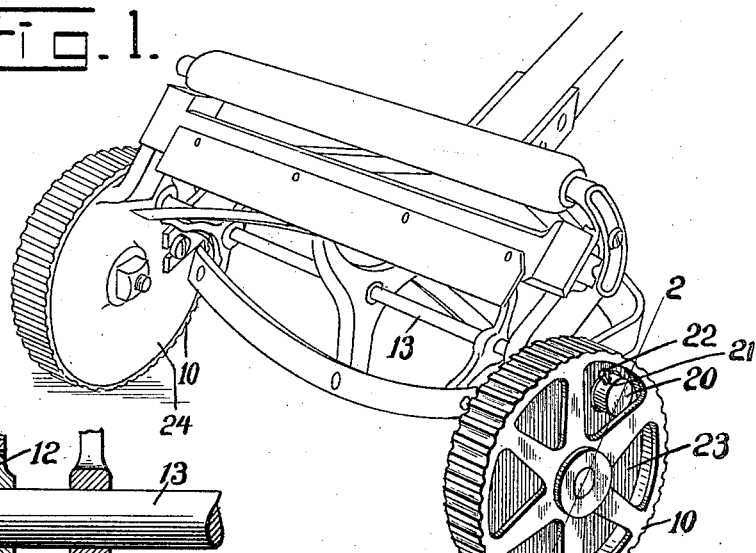
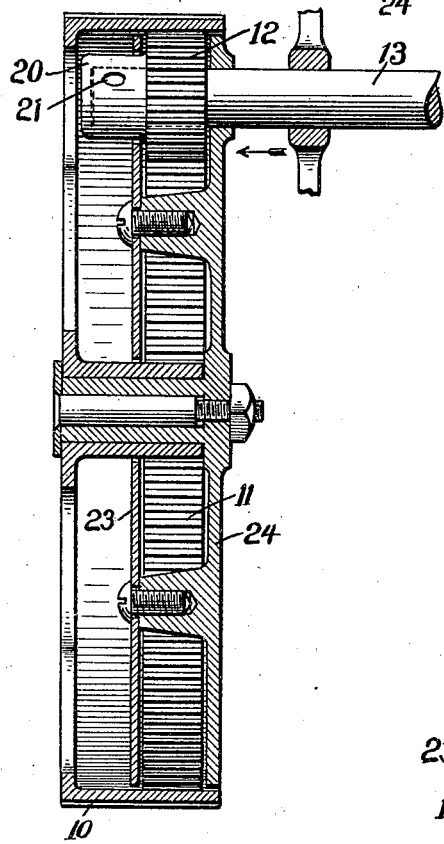
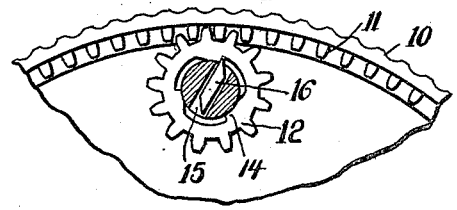
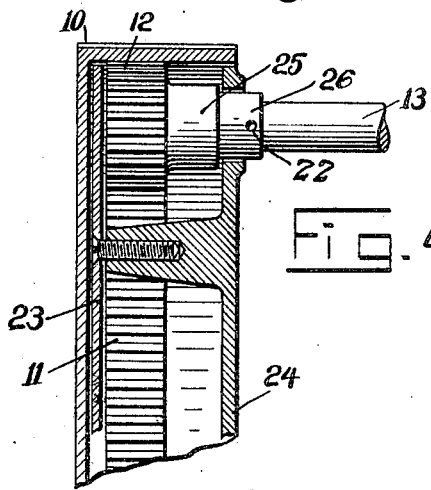
Inventor
John M. Davidson,
By F. K. Fassett,
Attorney

UNITED STATES PATENT OFFICE.

JOHN M. DAVIDSON, OF XENIA, OHIO.

ATTACHMENT FOR LAWN-MOWERS.

1,312,618. Specification of Letters Patent. Patented Aug. 12, 1919.

Application filed September 22, 1917. Serial No. 192,638.

*To all whom it may concern:*

Be it known that I, JOHN M. DAVIDSON, a citizen of the United States, residing at Xenia, in the county of Greene and State of Ohio, have invented a new and useful Improvement in Attachments for Lawn-Mowers, of which the following is a specification.

My invention relates to devices for rotating the cutting reel of a lawn mower in the reverse direction for the purpose of sharpening the blades. It has long been a practice to apply an abrasive, such as oil and emery flour, to the blades of the mower and rotate the reel backward for the purpose of sharpening the blades. Normally the reel cannot be rotated backward by the ground wheels because of the ratchet mechanism being adapted to rotate the reel only forward, and numerous devices have been tried for the purpose of rotating the reel backward. The object of my invention is to provide a device for this purpose which will be simple in operation and add practically nothing to the cost of the mower. Naturally, a device of this kind is seldom used; in fact, a mower can generally be used a whole season before it requires sharpening. It is important, therefore, that such a device shall not deteriorate and perhaps become useless from disuse. It should not have any parts which are liable to become immovable because of rust, nor should it be of such nature as might tend to weaken or otherwise impair the effectiveness of the vital parts of the mower. The device should be so simple that any layman—any householder, male or female—can easily understand and use it. Such a device is not only of real value on a mower but is a very attractive adjunct from the standpoint of the merchant who handles the mower, as it makes a very good talking point, particularly if it adds nothing to the cost of the machine.

In the accompanying drawings:

Figure 1 illustrates a mower of a common type equipped with my device and inverted so as to rotate the reel backward when the mower is pushed along the ground.

Fig. 2 is a section through one of the ground wheels on the line 2—2 Fig. 1.

Fig. 3 is a fragmental view looking in the direction of the arrow near Fig. 2, showing the reel shaft in section.

Fig. 4 shows a modified structure which will be referred to later.

The mower comprises the usual ground wheels 10, having internal gears 11, pinions 12 enmeshed with the internal gears and mounted on the ends of the reel shaft 13. The interiors of the pinions are recessed to form ratchet teeth 14, the recesses being narrow enough to leave a substantial amount of the bore of the pinions to bear on the shaft. The shaft is provided with transverse slots 15 in which sliding pawls 16 reciprocate. These pawls coöperate with the teeth 14 and enable the pinions to rotate the shaft when the ground wheels rotate forwardly, but permit the pinions to idle on the shaft when the wheels rotate backward.

The parts so far described are substantially such as are usually found in lawn mowers, at least of certain types. For the purpose of incorporating my device I form a hub 20 on one of the pinions and extend the shaft 13 into it as shown in dotted lines in Fig. 2. I then drill a hole 21 through the hub and shaft, into which a cotter pin 22 (see Fig. 1) is inserted when it is desired to rotate the reel backward to sharpen the blades. In Fig. 1 the cotter pin is in place and it is clear that when the inverted mower is pushed along the ground the shaft 13 will be positively rotated in a direction contrary to the direction in which it normally rotates.

The pinions are held in place on the shaft and enabled to oppose end play of the shaft, by retaining plates 23 which are secured to bosses formed on the frame members 24. This method of retaining the pinion is also in common use.

In case the cotter pin happens to be lost or mislaid a nail or a piece of stiff wire may be substituted. Even a hard wood peg would answer the purpose. In assembling the mower the pinion may be so enmeshed with the ground wheel that when one of the spokes of the wheel registers with the hub 20 the hole in the hub will lie crosswise of the spoke, so that one can get his fingers between the spokes to insert the pin. With a spoke opposite the hub, it is seen that an entire space between adjacent spokes will be available on each side of the hub, affording ample space in which to work. Having brought the pinion and ground wheel to the desired position it is an easy matter to rotate the reel by hand until the hole in the shaft registers with the hole in the hub. If the pin has already been inserted in the hole in the hub and is pressed against the shaft it will drop into the hole in the shaft as soon as it comes into place. Spreading the cotter pin slightly will prevent its falling out while the mower is being sharpened; if a nail or piece of wire is used it may be bent slightly, a very slight bend being all that is necessary to retain it.

As drilling the hole 21 and providing the cotter pin is the only expense chargeable to this device its cost may be considered negligible. The device cannot become unusable from disuse, because the worst that could happen would be filling up of the holes with dirt and grease. This could be easily removed; in fact inserting the pin would clear the hole.

In Fig. 4 the ratchet mechanism is confined in the hub 25. Attached to this hub is a smaller hub 26 which extends through the frame member 24, the hole 22 being drilled through this hub and the shaft 13. This construction enables the wheel 10 to be constructed solid; i. e., without spokes, a form of wheel preferred by some makers.

Obviously, the applicability of this device is not limited to the type of mower here illustrated and it is to be understood that such modifications are permissible as come within the scope of my claims.

What I claim is as follows:

1. In a lawn mower, a ground wheel having an internal gear, a pinion enmeshed therewith, a shaft on which the pinion is adapted to rotate freely, and a ratchet mechanism whereby the pinion drives the shaft in one direction; said pinion having a hub, which hub and the shaft have transverse holes drilled in alinement with each other, adapted to receive a cotter pin, nail or the like, whereby to lock the pinion and shaft together so the shaft will be rotated whichever way the ground wheel is rotated.

2. In a lawn mower, a frame member, a ground wheel rotatably mounted thereon, said wheel having an internal gear, a shaft journaled in said frame member, a pinion loosely mounted on the shaft and enmeshed with the internal gear, said pinion having a hub projecting from the side remote from the frame member, a retaining plate secured to the frame member, having an aperture through which the hub protrudes, the pinion being confined between the retaining plate and frame member, and ratchet mechanism whereby the pinion drives the shaft when it rotates in one direction, the pinion idling on the shaft when it rotates in the opposite direction; the hub on the pinion and the shaft within the hub having transverse holes drilled in them adapted to aline with each other so as to receive a pin, nail or the like whereby to lock the shaft and pinion together.

JOHN M. DAVIDSON.

Copies of this patent may be obtained for five cents each, by addressing the "Commissioner of Patents, Washington, D. C."